(12) United States Patent
Zoucha

(10) Patent No.: US 8,391,549 B2
(45) Date of Patent: Mar. 5, 2013

(54) METHODS AND SYSTEMS FOR PROCESSING DATA USING PRODUCT-LAW SYMMETRY DETECTION

(75) Inventor: Douglas M. Zoucha, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 883 days.

(21) Appl. No.: 12/480,152

(22) Filed: Jun. 8, 2009

(65) Prior Publication Data

US 2010/0310173 A1    Dec. 9, 2010

(51) Int. Cl.
*G06K 9/00* (2006.01)
*H04N 5/225* (2006.01)

(52) U.S. Cl. ........................ 382/103; 348/169

(58) Field of Classification Search ............... 382/103, 382/107, 236, 190; 348/169, 170, 171, 172, 348/208.1, 208.2, 208.14
See application file for complete search history.

(56) References Cited

U.S. PATENT DOCUMENTS

| | | | | |
|---|---|---|---|---|
| 4,748,578 | A * | 5/1988 | Lagadec et al. | 708/313 |
| 5,845,016 | A * | 12/1998 | Matsui et al. | 382/253 |
| 7,129,941 | B2 * | 10/2006 | Deering et al. | 345/422 |
| 7,743,272 | B1 * | 6/2010 | Cheung | 713/500 |

OTHER PUBLICATIONS

E. Wigner, Department of Physics, Princeton University, "On the Quantum Correction for Thermodynamic Equilibrium," Physical Review, vol. 40, Jun. 1, 1932.
Wikipedia "Mahalanobis Distance," May 1, 2009; retrieved from the Internet on May 28, 2009 at http://en.wikipedia.org/w/index.php?title=Mahalanobix_distance&printable=yes.
Wikipedia "Wiener Filter," May 28, 2009; retrieved from the Internet on May 28, 2009 at http://en.wikipedia.org/w/index.php?title=Wiener_filter& printable=yes.

* cited by examiner

*Primary Examiner* — Abolfazl Tabatabai
(74) *Attorney, Agent, or Firm* — Schwegman Lundberg & Woessner, P.A.

(57) ABSTRACT

Systems and devices for processing image or other data using product-law symmetry are described. In one implementation, an image or other collection of data has a number of samples each having an associated intensity, luminance, magnitude or other value. A sub-set of the samples is selected, and a product is computed of at least a first value associated with a first sample in the sub-set and a second value associated with a second sample in the sub-set that is different from the first sample. The resulting product can be used to provide an output, such as an enhanced image or an indication that a target is present within the sub-set of samples. In image processing applications, the product may be based upon data obtained from single or multiple images to exploit target symmetry and to distribute the effects of random noise, thereby improving target identification or otherwise enhancing the image.

19 Claims, 4 Drawing Sheets

METHODS AND SYSTEMS FOR PROCESSING DATA USING PRODUCT-LAW SYMMETRY DETECTION

TECHNICAL FIELD

The following discussion generally relates to image processing techniques and systems. More particularly, the following discussion relates to digital processing techniques that may be used to identify targets in images or other datasets, to enhance images, or to otherwise process data contained within an image or other dataset.

BACKGROUND

Many different data processing techniques have been used to identify objects in photographs or other datasets. Such techniques have been widely deployed in commercial, military, industrial and other situations. In a military setting, for example, digital imagery obtained from an aircraft or other source can be processed to identify the presence of missiles, unfriendly aircraft, or other objects of interest. Various processing techniques can allow for early detection of threats to aircraft, ships, vehicles, persons or structures that might otherwise be difficult to visually detect. Object recognition techniques are also used in other civilian and military aerospace and maritime settings (including underwater object detection), as well as in manufacturing and other industrial settings, commercial and personal photography, and in many other settings as well.

Generally speaking, it is desirable that such processing techniques be effective at identifying objects, be relatively fast, and be computationally efficient. A number of prior techniques that have been used to identify objects within images include Wiener filters, Mahalanobis filters, square-law filters and others. Each of these techniques, however, can exhibit marked disadvantages in certain settings. Wiener filters, for example, typically recognize patterns based upon previously-known information. If the patterns of certain targets are not known or if the target orientation, range or shape has varied from the a priori data provided to the Wiener filter, than the effectiveness of the filter can be significantly degraded. Square law filters, although not necessarily based upon a priori data, can have the undesired effect of amplifying background noise. Mahalanobis and Wiener filters commonly exhibit a further disadvantage in that they can be computationally intense in that they often require significant computing resources (e.g., processor cycles) to execute effectively. This can result in burdens on computing hardware, delays in obtaining results, and other undesired effects.

It is therefore desirable to create data processing systems and techniques that are effective, computationally manageable, and that are flexible enough to operate effectively without significant a priori data. These and other desirable features and characteristics will become apparent from the subsequent detailed description and the appended claims, taken in conjunction with the accompanying drawings and this background section.

BRIEF DESCRIPTION

Various systems, devices and methods for processing image, signal or other data using product-law symmetry are described. In one implementation, an image or other collection of data has a number of samples each having a sample value. In image processing applications, for example, an image may have a number of pixels, each with a corresponding intensity, luminance or other value associated with the pixel. A sub-set of the samples is selected, and a product is computed of at least a first value associated with a first sample and a second value associated with a second sample that is different from the first sample. The resulting product can be used to provide an output, such as an enhanced image or an indication that a target is present within the sub-set of samples. The product may be based upon data obtained from single or multiple images (or other data collections) to exploit target symmetry and to distribute the effects of random noise, thereby improving target identification, enhancing the image, or providing other benefits as desired.

Other embodiments provide methods implementable by a computer for detecting a target present within image data comprising a plurality of pixels each having a pixel value. The method comprises selecting a sub-set of the plurality of pixels, ordering each of the pixel values corresponding to the pixels in the sub-set into a first vector, reordering the pixel values associated with the pixels in the sub-set into a second vector that is different from the first vector, computing a scalar product of the first and second vectors in such a manner that the pixel values associated with the first vector are multiplied with pixel values corresponding to different pixels in the second vector, comparing the scalar product of the first and second vectors with a threshold value to thereby identify the target within the sub-set of the plurality of pixels, and repeating the selecting, ordering, reordering, computing and comparing for additional sub-sets of the plurality of pixels.

Still other embodiments relate to systems for processing data comprising a plurality of samples each having a sample value. The system comprises an acquisition module configured to receive at least one dataset comprising the data, a processing module configured to select a sub-set of the plurality of samples in the data and to compute a product of at least a first sample value associated with a first one of the plurality of samples in the sub-set and a second sample value associated with a second one of the plurality of samples in the sub-set that is different from the first sample, and an output module configured to provide an output that is based upon the product.

The various implementations may be enhanced or modified in many different ways to create any number of alternate embodiments. In some implementations, for example, the product may be based upon pixel data obtained from single or multiple images to exploit target symmetry and to distribute the effects of random noise, thereby improving target identification or otherwise enhancing the image.

Various other embodiments, aspects and other features are described in more detail below.

BRIEF DESCRIPTION OF THE DRAWING FIGURES

Exemplary embodiments will hereinafter be described in conjunction with the following drawing figures, wherein like numerals denote like elements, and FIG. 1 is a block diagram of an exemplary system for processing data;

DETAILED DESCRIPTION

Figure 1:
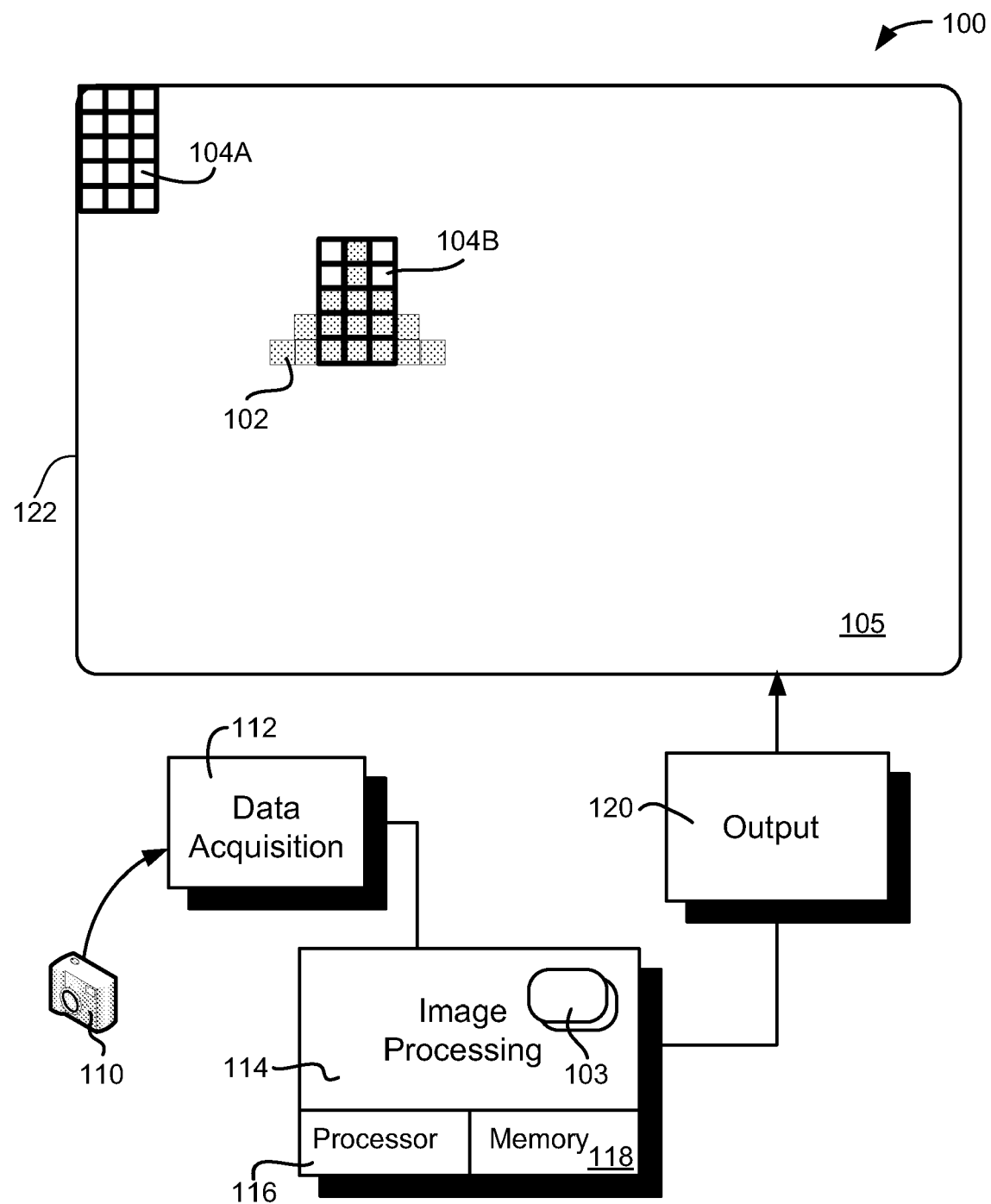

The following detailed description is merely exemplary in nature and is not intended to limit the invention or the application and uses of the invention. Furthermore, there is no intention to be bound by any theory presented in the preceding background or the following detailed description.

Various embodiments exploit symmetry and the random nature of many types of noise to improve object detection within an image or other set of data. According to various embodiments, a number of "kernels" or sub-sets of sample values are evaluated to determine if target objects are present within each kernel. In an image processing implementation, for example, samples may correspond to pixel values such as intensity, luminance or other attributes. These values may be ordered for all of the samples in the sub-set. Each sample value is then combined with at least one other sample value (e.g., sample values may be multiplied) to create a product value that can be evaluated, used to create an enhanced image, or used for any other purpose. In some embodiments, some or all of the sample values associated with the samples in the sub-set are arranged as a first vector, then reordered to create a second vector having a different order from the first vector. A scalar ("dot") product of the two vectors may then be calculated to arrive at a product value that is representative of the multiple samples in the sub-set. Other embodiments, however, may process the product value in any number of other ways.

Using products of different sample values can provide a number of benefits in enhancing images and/or identifying targets. In images that contain random or near-random noise having positive or negative magnitudes, for example, these random values will tend to cancel and/or average toward zero when they are mathematically combined with each other. Moreover, when a target is present within the kernel, then the intensity of the target will be increased greatly when the multiple samples overlying the target are combined with each other. Stated another way, the inter-kernel symmetry of the target will tend to make the target easier to detect when data from the multiple samples containing target imagery are combined with each other. Similar benefits may be obtained in signal processing implementations, wherein target objects may be identified within collections of data samples based upon the symmetry present within the target objects. These concepts are described in increasing detail below.

The various systems and techniques described herein may find use in any number of settings. For convenience, the following discussion may emphasize target detection and other image processing applications, such as those used in identifying aeronautical or maritime targets in military settings. Equivalent systems and techniques, however, may be applied in any military, commercial, industrial, personal or other setting that uses object recognition, image enhancement or the like. In general, the following techniques and systems may be used in any setting that involves identifying an object in a decorrelated clutter or other noise-limited environment.

Various exemplary embodiments relate to image processing for improving image quality, identifying targets within the imagery, and/or performing other tasks as desired. The image processing described herein with reference to pixel values, however, may be readily adapted and applied to other signal and data processing applications, including any applications concerned with pattern recognition, data smoothing, target identification, or the like. Synthetic aperture or other radar image formulation, for example, could benefit from the present techniques, especially if noise is decorrelated (or can be made to decorrelate) and/or if a priori information about particular targets is not available. The processing techniques described herein may therefore be equivalently performed on conventional image data or any other type of sample data, including non-image data organized in any manner. Image processing is therefore described as just one exemplary implementation of the techniques and systems described herein, and other embodiments may relate to any number of different applications, implementations and settings.

Turning to the drawing figures and with reference now to FIG. 1, an exemplary system 100 for processing data suitably includes a data acquisition module 112, an processing module 114, and an output module 120. In the embodiment shown in FIG. 1, output module 120 is a display generator that produces an image 105 that can be presented on a display 122. Image 105 may include one or more objects 102 to be detected. Object 102 may correspond to a target (e.g., a missile or unfriendly vessel), for example, although other embodiments may detect or enhance any number of other objects 102 as desired, and as described more fully below.

Processing module 114 is any hardware, software or combination thereof capable of processing data as described herein. In various embodiments, processing module 114 is implemented in software or firmware that can be stored in any conventional memory 118 or mass storage, and that can be executed on any conventional processor 116. To that end, processing module 114 may be implemented using a personal computer, workstation or the like based upon general purpose computing hardware; in other embodiments, processing module 114 is implemented in a special-purpose computer using specially-designed processing, data storage and/or other circuitry, such as any sort of hardware designed for deployment in aerospace, maritime, battlefield or other demanding environments.

Data acquisition module 112 is any hardware, software or combination thereof capable of receiving data from any source and of providing the data to processing module 114. In various embodiments, acquisition module 112 receives digital or analog imagery from a camera 110 or other source. Module 112 may also perform any analog-to-digital conversion, format conversion or other manipulation that is useful in placing received imagery data into a format that is usable by processing module 114. In various embodiments, acquisition module 112 is a software process or routine executing on the same processor 116 as processing module 114, although other embodiments may separate the acquisition and processing functions between two or more different processors.

Output module 120 is any hardware, software or combination thereof that is capable of receiving any output from processing module 114. Output module 120 may be implemented, for example, using software or firmware instructions residing within memory 118 or mass storage and executed on the same processor 116 as processing module 114. Alternatively, output module 120 may be implemented on separate hardware (e.g., on a separate computing system) from processing module 114.

In various embodiments (such as the example shown in FIG. 1), output module 120 is a display generator that is capable of rendering imagery 105 on any sort of display 122. This imagery 105 may be presented to a pilot, vehicle operator or other viewer for identification of objects 102 contained within the imagery 105. As described more fully below, various embodiments may enhance the imagery 105 so that objects 102 are more readily visible to the viewer. Other embodiments may automatically detect and highlight objects 102 (e.g., by placing an indicator near the object 102) as desired. Still other embodiments of output module 120 may provide audible or other indications that objects 102 are detected within the imagery 105, without necessarily rendering imagery 105 on a display 122. Still other embodiments of output module 120 may simply transmit information about a detected object 102 to another computer system or the like, or may take any other action as desired.

Datasets 103 are any groupings or collections of sample data that can be processed within system 100. In various embodiments, datasets 103 represent image data, such as data used to generate image 105 on display 122. Data contained in acquired imagery or other datasets 103 may be processed as appropriate for any purpose. Data may be processed to enhance a displayed image 105, to identify objects 102 represented within the data, or to perform other tasks as desired. In an exemplary embodiment, dataset 103 is generated from a bitmap-type or other digital image data that represents imagery with any number of pixels. Pixels, in this sense, are discrete components of an image or picture that can be characterized by any number of attribute values. In a conventional monochrome image, for example, each pixel may be represented by a luminance value that represents the intensity of light in that portion of the image. Color images may have pixels that are described by luminance values, as well as a chroma value that represents the color of the pixel. Pixels of monochrome and color images may be represented in any other manner to create images in any format. Again, other embodiments may process other types of data in addition to or in place of image data.

In some embodiments, then, data represented in image 105 is captured primarily for the detection of objects 102. Such an image may be, for example, an image that captures radiation in the infrared, ultraviolet, radio frequency (RF) or other visible or non-visible spectra. In a decorrelated clutter environment, for example, images 105 may be made up of any number of monochrome-type pixels each representing the intensity of detected infrared radiation in that portion of the image. Because many potential threats (e.g., missiles, aircraft) tend to radiate heat energy that is detectable in the infrared spectrum, infrared images may be highly indicative of targets. In such images, pixels that correspond to detectable objects will typically have greater intensities than the surrounding pixels, provided that the target signal can be extracted from the background noise of the image.

As noted above, the techniques described herein are not limited to processing of image data. While imagery 105 may be generated directly from one or more datasets 103 in some embodiments, this dataset 103 need not represent a literal, renderable image in all embodiments. To the contrary, datasets 103 may represent any collection of sample data that can be processed to identify targets or to perform other tasks as desired. To that end, dataset(s) 103 used in processing need not be used to generate imagery 105 in all embodiments. Alternate datasets 103 may contain any number of sample values representing data of any sort. Further, data processing in some embodiments may be performed on multiple images or multiple datasets 103, as described more fully below.

Data sets 103 may be processed in some embodiments by considering any number of "kernels" 104A-B. Each kernel 104A-B represents a sub-set of the samples (e.g., pixels) within a dataset 103. The particular size of each kernel 104 will vary from embodiment to embodiment. In general, it is desirable that the kernel 104 be sized to approximately match the size of any target objects 102 at the farthest detectable range. That is, it would be desirable that any detectable object 102 fill as much of the kernel 104 as possible, for reasons that will become apparent below.

Objects 102 lying within the kernel 104 of dataset 103 are much easier to detect if sample values that represent the object 102 are multiplied (or otherwise combined) with other sample values that also reflect the presence of the object 102. Conversely, if values from multiple samples that do not reflect the presence of object 102 are combined with each other, their combined values would typically be the product of only random noise, which would tend to cancel or average toward zero in repeated calculations. By creating mathematical combinations of sample values from pixels located in relatively close proximity to each other, then, the signal produced by the dataset 103 can be enhanced since every sample on object 102 can be made to contribute to the signal presence response while the noise is effectively reduced.

Figure 2:
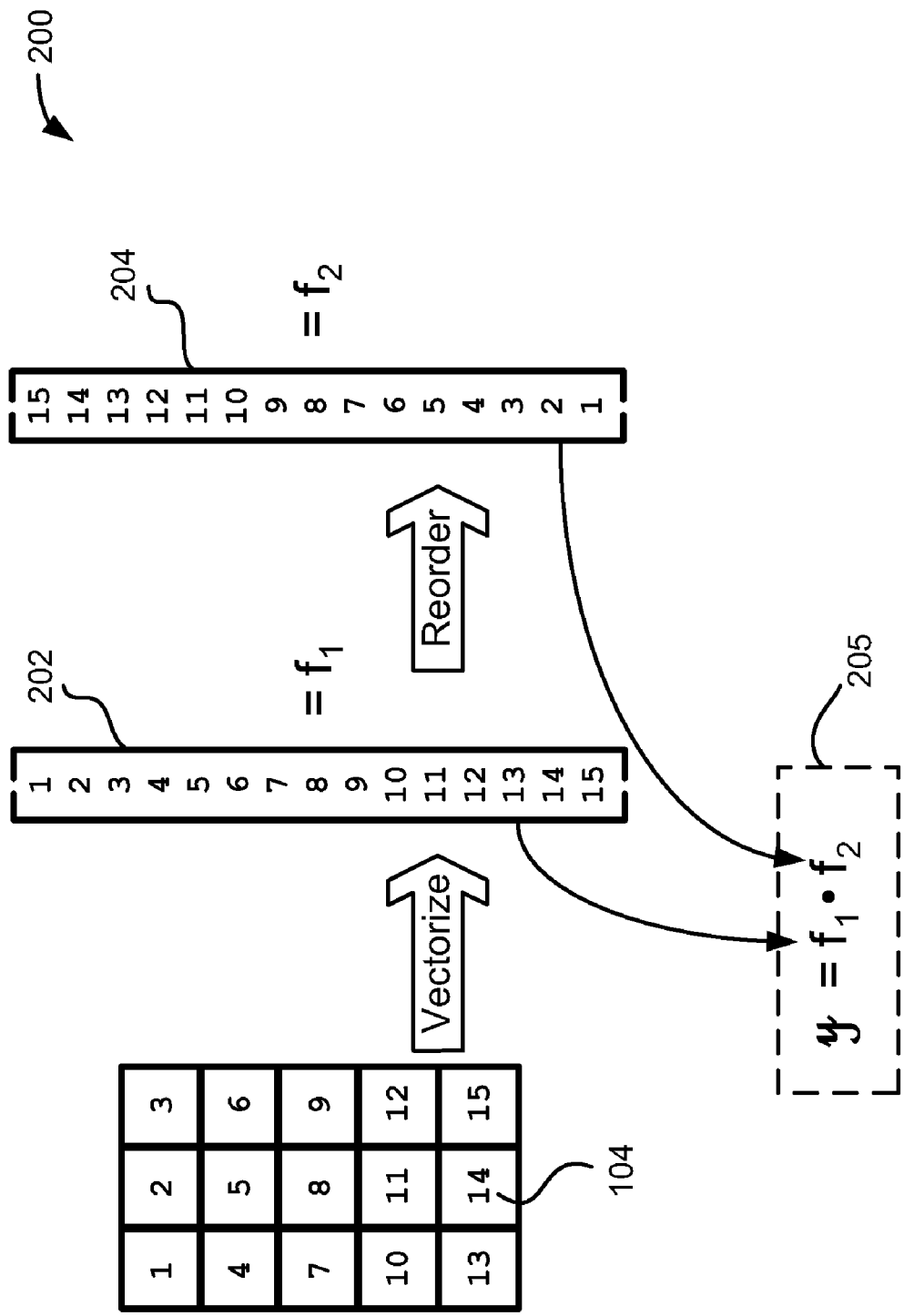
FIG. 2 is a diagram of an exemplary technique for ordering and re-ordering sample values.

Turning to FIG. 2, the various sample values (e.g., pixel luminance or intensity values) associated with the data samples within the kernel 104 can be mathematically combined with each other in any manner. In the example shown in FIG. 2, sample values for each sample (e.g., pixel) in kernel 104 are initially vectorized or otherwise ordered in any logical manner. Vector 202 in FIG. 2, for example, simply lists the sample values for each of the fifteen samples contained within kernel 104 in any order. This vector 202 may be represented by a conventional array of sample values stored in memory 118 (FIG. 1) or any other location as appropriate. Vector 202 may be alternately represented with a stack, queue, linked list or other structure, as appropriate to the particular embodiment.

Some or all of the sample values in vector 202 can be combined with sample values from other pixels within the kernel 104 in any manner. One way to combine the various sample values is to create a second vector 204 using the same values, but ordered differently from the first vector 202. Second vector 204 in FIG. 2, for example, is inverted from the first vector 202 so that most, if not all, of the sample values in second vector 204 correspond to different values of second vector 204. Computing a scalar ("dot") product of the two vectors 202, 204 therefore results in a scalar product ("y") that represents multiple (if not all) of the values within the two vectors 202, 204. This resulting value 205 can be compared to an empirically-determined (or other) threshold value to identify the presence of an object 102. Alternatively, the resulting value 205 can be used to generate an intensity or other sample value for an output image (e.g., for presentation on display 122) that enhances regions where the object 102 is located (e.g., with a greater pixel intensity value) and that reduces the intensity of background noise.

It is not necessary that all of the sample values be obtained from the same image or other data set 103. In some embodiments, two or more datasets 103 may be obtained (e.g., from two or more images 105), and sample values from overlapping regions may be used to further enhance the result. That is, data from samples corresponding to the same spatial region (e.g., the same location in space where the object 102 is to be detected) across two or more different datasets 103 can be used to populate vectors 202, 204 in some implementations. As an example, values in vector 202 can be obtained from a first dataset 103, with values in vector 204 obtained from a different dataset 103 that nevertheless encompasses the same region in space where objects 102 may be identified. The scalar product 205 that is computed based upon such vectors 202, 204 will therefore reflect values obtained from multiple datasets 103, thereby incorporating additional information and improving the effectiveness of the processing.

By computing a mathematical product based upon the combined effects of multiple samples located within a kernel region, then, signals produced by a detected object 102 can be amplified while the effects of by randomly-varying noise can be attenuated. This effectively exploits properties of object symmetry, since a detected object will tend to occupy multiple samples within the kernel 104, without requiring a priori knowledge of the object shape as is often required for optimal linear filter response.

Figure 3:
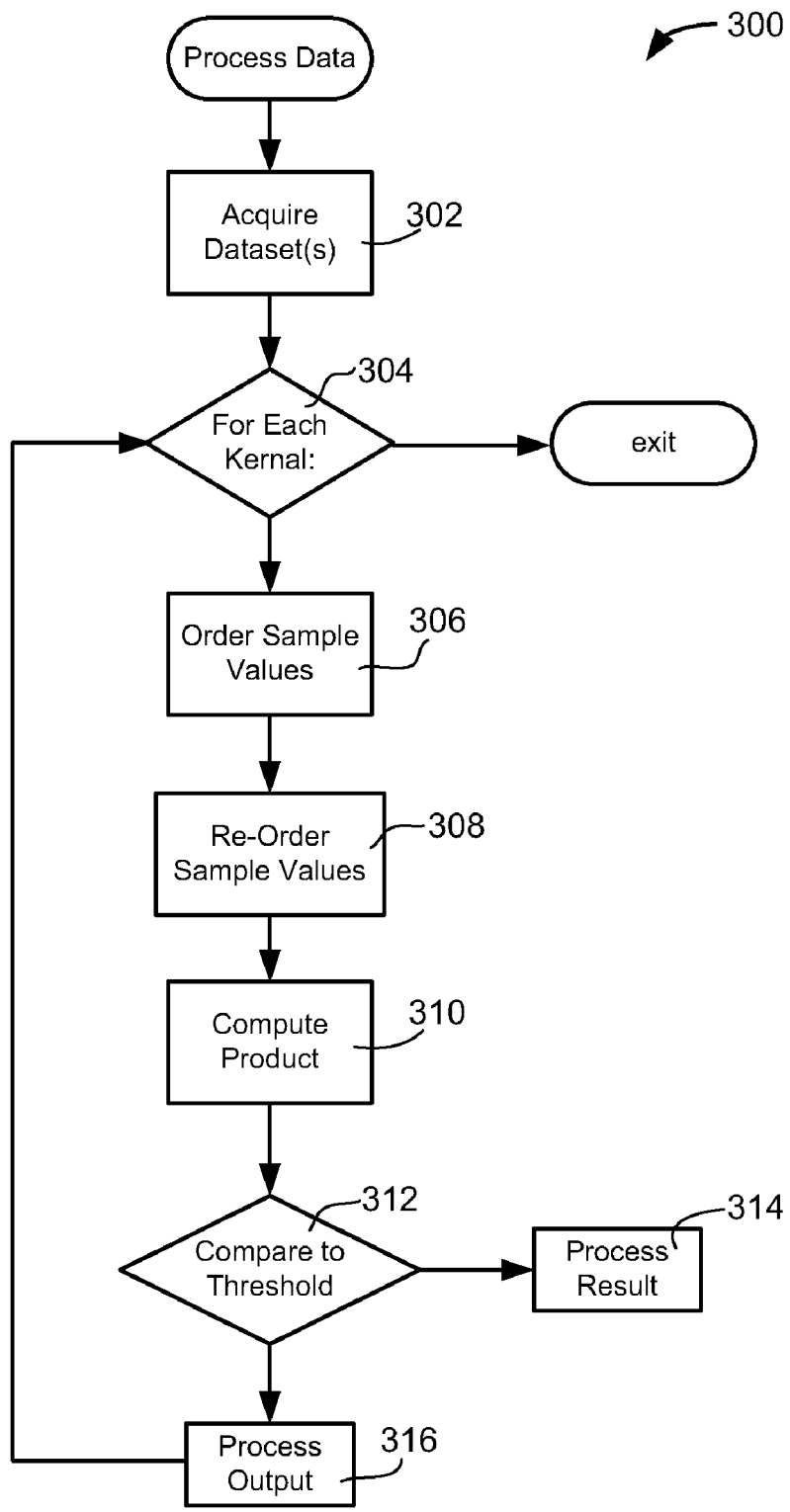
FIG. 3 is a flowchart of an exemplary technique for processing data.

FIG. 3 shows an exemplary process 300 for processing sample data that is consistent with the above concepts. Generally speaking, process 300 includes the broad steps of selecting a kernel sub-set of samples within the image or other data set 103 (function 304), computing a product of at least two different samples from within the kernel (function 312), and providing an output based upon the computed product (function 316). Various other features of certain exemplary embodiments are also shown within FIG. 3, as described more fully below.

In various embodiments, data is obtained (function 302) from an acquisition module 112, camera 110 or other source. As noted above, acquired data typically includes any number of samples that have corresponding values for intensity and/or the like. In an image processing implementation, for example, the acquired data may be an image having any number of pixel "samples", with each pixel having an associated value for intensity, luminance or the like that can be processed as a sample value associated with that pixel. In equivalent embodiments, however, the sample values may represent values other than pixel values, such as intensity or any other scalar quantity that can be arranged into a matrix or array of values using any data processing techniques.

Data may be processed in any manner. In various embodiments, the images or other datasets are initially filtered as desired. A conventional high pass filter may be applied to remove undesired low frequency components, for example. Other embodiments may perform any sort of format conversion, filtering, signal smoothing, averaging or other pre-processing as desired.

Samples contained within a dataset 103 may be grouped into kernels or other sub-sets in any manner (function 304). As noted above, it may be desirable to select kernel sizes that correspond to the expected size of detected objects 102 at the furthest detectable range. That is, it is desirable to create kernels 104 that are sized such that objects 102 located within the kernel 104 tend to overlap multiple samples within the kernel 104 that are mathematically combined with each other. This effectively amplifies the mathematical product computed from the multiple samples. Conversely, if no object 102 is located within the kernel 104, then the random (or nearly random) noise present within the kernel 104 will tend to cancel when the sample values are combined with each other. Also, the reordering can decorrelate correlated (fixed pattern) noise so that signal-absent samples tend to cancel.

Sample data may be combined in any manner. As noted above, one technique for combining the values of multiple samples within a kernel 104 involves placing the sample values into a first order (function 306), re-ordering the sample values into a second order (function 308), and then computing a product of the two sets of data (function 310). This may be accomplished using the vector techniques described in FIG. 2 above (e.g., by computing the scalar dot product of two vectors), or in any other manner. That is, the product computed in function 310 may be a scalar product of two vectors 202, 204 representing data associated with samples in the kernel 104 of interest. As noted above, some embodiments may further consider data that spans multiple images or other datasets 103.

In various embodiments, the vector techniques described above may be replaced by simply storing the sample values associated with the samples in the kernel 104 in a convenient manner (e.g., as an array or other structure in memory 118) and applying a suitable process to obtain the desired output value. Several examples of suitable processes are described below with respect to FIGS. 4 and 5.

As noted above, various embodiments may provide different types of outputs based upon the product computed in function 310. In various embodiments, the resulting scalar product value is compared to a threshold (function 312) to determine whether an object 102 is detected within the kernel. Such thresholds may be empirically derived, or otherwise determined using conventional techniques. In an exemplary embodiment, the product value computed based upon multiple samples representing an identified object 102 will typically be significantly greater than the values produced by samples that are not associated with an object, thereby allowing relatively convenient automatic detection of the object 102 based upon the computed value. If the computed product exceeds (or otherwise compares favorably) with the relevant threshold value, an object 102 can be identified (function 314) in any manner. As noted above, various image processing embodiments may provide additional symbology in a displayed image 105 that highlights the identified image. Other notifications (e.g., other visual, audible, tactile or other feedback) may also be provided, as desired.

Other embodiments may additionally or alternately provide different types of outputs 316. In some implementations, the techniques used herein may be used to create a new output image based upon the combined pixel values processed in function 310. In such embodiments, a new pixel value (e.g., a pixel intensity) may be generated based upon the computed product for any number of pixels in the new image. Each kernel 104A-B may be further used to create a unique pixel value that can be presented in the resulting image. Further, pixels in the original image can be used in multiple kernels 104 as desired. By using overlapping kernels to create multiple output pixel values, an output image that has approximately the same resolution as the input imagery can be created. Again, because the processed values are the product of multiple pixel values within the kernel, noise occurring within the kernel will tend to average out, and objects 102 that overlap multiple pixels within the kernel will tend to be emphasized in the resulting image.

Generally speaking, each of the various steps in process 300 may be performed by computing hardware, firmware or software executing in any computing environment. In an exemplary embodiment, process 300 is implemented in software instructions that are associated with processing module 114 (operating alone or in conjunction with acquisition module 112 and/or output module 120), that can be stored in memory 118 or in any other mass storage, and that can be executed on processor 116. Other embodiments may be implemented in dedicated processing hardware, firmware and/or other means as desired.

Figure 4:
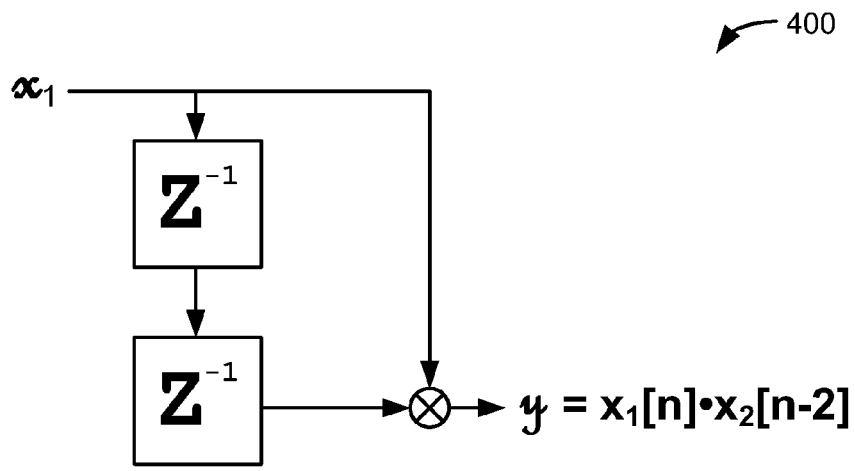
FIG. 4 is a block diagram of an exemplary technique for processing data from a single dataset.
Figure 5:
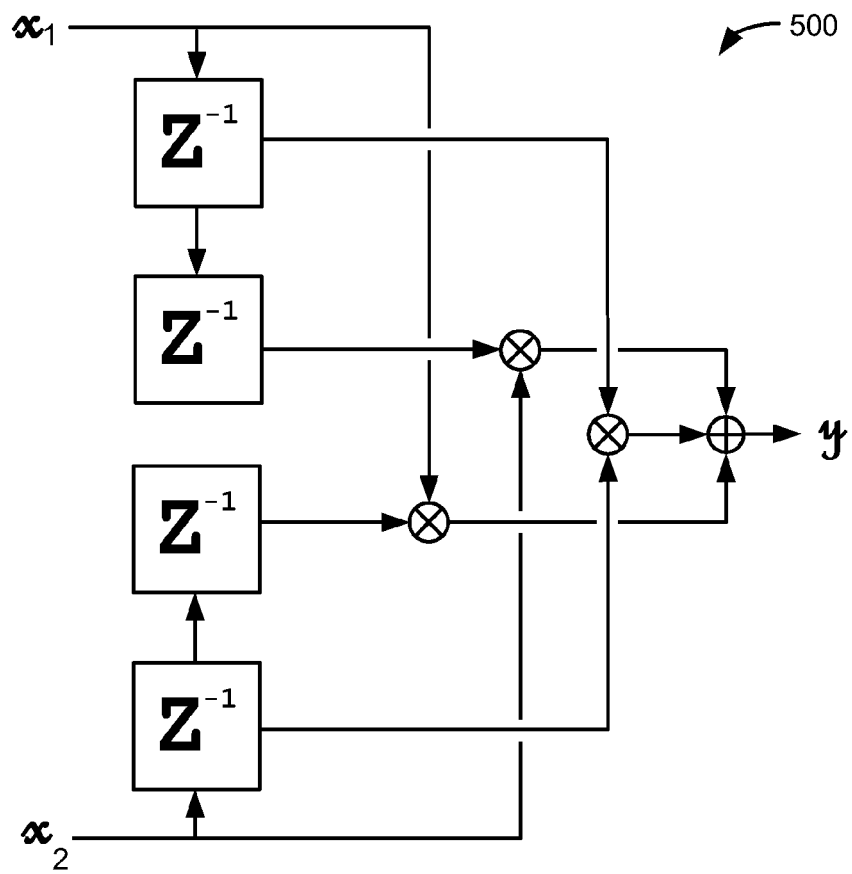
FIG. 5 is a block diagram of an exemplary technique for processing data from multiple datasets.

FIGS. 4 and 5 show exemplary processes that may be performed (e.g., by processing module 114) on one or more data sets 103 to produce computed products that emphasize detected objects 102 within a particular kernel. Both of these figures show examples based upon kernels that contain only three samples (e.g., $x_1[n]$, $x_1[n-1]$ and $x_1[n-2]$) for simplicity. Equivalent concepts, however, could be applied to kernel sizes having any number of samples. Further, FIGS. 4 and 5 show features ($Z^{-1}$) that are commonly associated with time delays. These features are not intended in the traditional temporal delay sense, but rather in a spatial progression in that the next sample from the same set 103 would be obtained. Further, the actual mathematical values obtained from the techniques shown in FIGS. 4-5 may be supplemented or enhanced in any number of ways. The computed values may be scaled, filtered or otherwise adjusted, for example, before being used as an intensity or other sample value in an output image 105.

FIG. 4 shows a simple technique 400 that could be used with a single input dataset ($x_1$) having any number of three-sample kernels. In this technique, the values of the first and last sample values ($x_1[n]$ and $x_1[n-2]$, respectively) are combined with each other to result in a scalar output ("y") that is a product of the first and last samples in the three-sample sub-set. Note that this particular example ignores the value of the middle sample ($x_1[n-1]$), although this value could be readily combined (e.g., added, or squared or otherwise scaled and then added) with the computed value in other embodiments.

FIG. 5 similarly shows a simple technique 500 that could be used to compute a scalar output product based upon data obtained from two different datasets 103 (i.e., $x_1$ and $x_2$) each having three-sample kernels. In this example, the first sample (x[n]) from each dataset is combined with the third sample (x[n-2]) from the other dataset. The two terms resulting from these combinations are then combined with the product of the two middle samples (x[n-1]) resulting from the two sets. The resulting product ("y") is therefore based upon six different sample values resulting from two different datasets. If an object 102 is present within these samples, the result ("y") obtained from this calculation will amplify the effect of the object 102; conversely, if no object 102 is present, it is likely that the randomness of background noise will tend to reduce the value of "y", therefore greatly improving the contrast between the detected object 102 and the background noise occurring within the datasets 103. Again, the concepts set forth in FIGS. 4 and 5 may be readily expanded to much larger kernel sizes.

Various systems and techniques for processing image data are therefore described. As noted at the outset, these techniques and systems may be variously applied in any military, industrial, commercial, medical, personal or other setting for image enhancement, target/object recognition, and/or other benefits as appropriate.

As used herein, the word "exemplary" means "serving as an example, instance, or illustration". "Exemplary" embodiments are not intended as models to be literally duplicated, but rather as examples that provide instances of embodiments that may be modified or altered in any way to create other embodiments. Any implementation described herein as "exemplary" is not necessarily to be construed as preferred or advantageous over other implementations.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. Various changes may be made in the function and arrangement of elements described without departing from the scope of the invention and its legal equivalents.

What is claimed is:

1. A method executable by a computer for processing data comprising a plurality of samples each having a corresponding sample value, the method comprising:
   selecting, by the computer, a sub-set of the plurality of samples;
   ordering the sample values corresponding to the samples in the sub-set into a first vector, the ordering of the sample values comprising assigning a sample value corresponding to a first sample of the sample values to a first position in the first vector;
   reordering the sample values corresponding to the samples in the sub-set into a second vector that is different from the first vector, the reordering of the sample values comprising assigning the sample value corresponding to the first sample to a second position in the second vector different from the first position;
   computing, by the computer, a scalar product of the first vector and the second vector such that the sample values in the first vector are multiplied with sample values corresponding to different samples as reordered into the second vector; and
   providing an output based upon the product from the computer.

2. The method of claim 1 wherein the computing comprises placing each of the sample values associated with the samples in the sub-set into a first order.

3. The method of claim 2 wherein the computing further comprises reordering the sample values associated with the samples in the sub-set into a second order that is different from the first order.

4. The method of claim 3 wherein the product is a product of the first and second orders.

5. The method of claim 4 wherein the first order represents a first vector, the second order represents a second vector, and the product is a scalar product of the first and second vectors.

6. The method of claim 1 wherein the providing comprises comparing the product to a threshold value to thereby determine whether a target is present within the sub-set of the plurality of samples.

7. The method of claim 1 further comprising repeating the selecting, computing and providing for each of a plurality of different sub-sets of the plurality of samples.

8. The method of claim 7 wherein the providing comprises generating an output having a plurality of output sample values, wherein each of the output sample values is based upon the product computed based upon one of the different sub-sets of the plurality of samples.

9. The method of claim 1 wherein the product is based upon each of the values associated with each of the samples in the sub-set.

10. The method of claim 1 wherein each of the plurality of samples is a value relating to an image, and wherein the first value and the second value are obtained from separate images.

11. A method implementable by a computer for detecting a target present within image data comprising a plurality of pixels each having a pixel value, the method comprising:
   selecting, by the computer, a sub-set of the plurality of pixels;
   ordering, by the computer, the pixel values corresponding to the pixels in the sub-set into a first vector, the ordering of the pixel values comprising assigning a pixel value corresponding to a first pixel of the pixels to a first position in the first vector;
   reordering, by the computer, the pixel values corresponding to the pixels in the sub-set into a second vector that is different from the first vector, the reordering of the pixel values comprising assigning the pixel value corresponding to the first pixel to a second position in the second vector different from the first position;

computing a scalar product of the first and second vectors by the computer in such a manner that the pixel values associated with the first vector are multiplied with pixel values corresponding to different pixels as reordered into the second vector;

comparing the scalar product of the first and second vectors with a threshold value to thereby identify the target within the sub-set of the plurality of pixels by the computer; and repeating the selecting, ordering, reordering, computing and comparing for additional sub-sets of the plurality of pixels.

12. The method of claim 11 further comprising generating an output image having a plurality of output pixel values, wherein the output pixel values are based upon the scalar products computed based upon the additional sub-sets of the plurality of pixels.

13. The method of claim 11 wherein the pixel values in the first vector are obtained from a first image and the pixel values in the second vector are obtained from a second image.

14. A computer-implemented system for processing data comprising a plurality of samples each having a sample value, the system comprising:

an acquisition module configured to receive at least one dataset comprising the data;

an processing module configured to select a sub-set of the plurality of samples in the data, to order the sample values corresponding to the samples in the sub-set into a first vector, to order the sample values comprising assigning a sample value corresponding to a first sample of the samples to a first position in the first vector, the processing module configured to reorder the sample values corresponding to the samples in the sub-set into a second vector that is different from the first vector, to reorder the sample values comprising assigning the sample value corresponding to the first sample to a second position in the second vector different from the first position, and the processing module configured to compute a scalar product of the first vector and the second vector such that the sample values in the first vector are multiplied with sample values corresponding to different samples as reordered into the second vector; and an output module configured to provide an output that is based upon the product.

15. The system of claim 14 wherein the processing module is configured to compute a different product for each of a plurality of different sub-sets of the plurality of samples.

16. The system of claim 15 wherein the output module is a display generation module configured to generate an image on a display, wherein the image comprises a plurality of pixels each having a pixel value, and wherein each of the pixel values is determined based upon one of the different products.

17. The system of claim 14 wherein the processing module is further configured to identify a target within the sub-set based upon the product, and wherein the output comprises an indication that the target is present within the sub-set of the plurality of samples.

18. The system of claim 17 wherein the processing module is further configured to identify the target by comparing the product to a threshold value.

19. The system of claim 14, wherein the at least one dataset comprises a first dataset and a second dataset, wherein the sample value corresponding to the first sample is obtained from the first dataset and the sample value corresponding to a second sample is obtained from the second dataset.

* * * * *